US007415026B2

(12) United States Patent
Hsu et al.

(10) Patent No.: US 7,415,026 B2
(45) Date of Patent: Aug. 19, 2008

(54) METHOD AND APPARATUS FOR SESSION RELEASE IN A COMMUNICATION SYSTEM

(75) Inventors: Raymond T. Hsu, San Diego, CA (US); John W. Nasielski, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 900 days.

(21) Appl. No.: 10/067,586

(22) Filed: Feb. 4, 2002

(65) Prior Publication Data

US 2003/0149772 A1 Aug. 7, 2003

(51) Int. Cl.
*H04L 12/28* (2006.01)
(52) U.S. Cl. .................................. 370/395.3; 370/395.2
(58) Field of Classification Search .................. 370/338, 370/441, 389, 373, 352–358, 377, 384, 385, 370/386, 390, 392, 393, 395.2, 395.21, 395.3, 370/395.52, 426, 331, 329, 332
See application file for complete search history.

(56) References Cited

U.S. PATENT DOCUMENTS

| | | | |
|---|---|---|---|
| 6,119,160 A | 9/2000 | Sitaraman et al. | |
| 6,560,239 B1 * | 5/2003 | Frid et al. | 370/426 |
| 6,775,262 B1 * | 8/2004 | Skog et al. | 370/349 |
| 6,792,457 B1 * | 9/2004 | Zhang et al. | 709/224 |
| 6,819,663 B2 * | 11/2004 | Komuro | 370/352 |
| 6,854,014 B1 * | 2/2005 | Amin et al. | 709/227 |
| 6,999,449 B2 * | 2/2006 | Barna et al. | 370/352 |
| 2001/0028636 A1 * | 10/2001 | Skog et al. | 370/328 |
| 2002/0120759 A1 * | 8/2002 | Faccin et al. | 709/230 |
| 2003/0028806 A1 * | 2/2003 | Govindarajan et al. | 713/201 |
| 2003/0079021 A1 * | 4/2003 | Fan | 709/227 |

FOREIGN PATENT DOCUMENTS

| | | |
|---|---|---|
| WO | 200044133 | 7/2000 |
| WO | 200167786 | 9/2001 |

OTHER PUBLICATIONS

Alfano, Frank, et al., "PDF to P-CSCF Interface," 3rd Generation Partnership Project 2 "3GPP2," Lucent Technologies, Kobe meeting Oct. 2003.
Stevens, W, R., "TCP/IP Illustrated, vol. 1 The Portocols, TCP Timeout and Retransmission," TCP/IP Illustrated vol. 1: The Protocols, Professional Computing Series, Reading MA: Addison Wesley, US. vol. 1, pp. 297-337.
3GPP: "Wireless IP Network Standard" 3GPP Standard, Jul. 16, 2001, XP002234109.
International Search Report PCT/US2003/003360, International Search Authority-European Patent Office, Jul. 10, 2003.
Netbrain: "Help On: MACPPP Setup" Netbrain Home Page, 'Online! Mar. 4, 1996, pp. 1-4, XP002253504.

* cited by examiner

*Primary Examiner*—Brenda Pham
(74) *Attorney, Agent, or Firm*—Abdollah Katbab; Kam T. Tam; Thomas R. Rouse

(57) ABSTRACT

A method and apparatus for session release in a communication system supporting Internet Protocol (IP) communications. In one embodiment, when the MS has lost a bearer connection (i.e., PPP session), the notification is provided by a Packet Data Service Node (PDSN) to the serving Session control Manager (SCM) via IP multicast. If two PPP sessions are active for a given IP communication, and one PPP session is not lost, the PDSN associated with the active PPP session sends a correction message to ignore any notification message sent by the other PDSN. In an alternate embodiment, the Authentication Authorization Accounting (AAA) server uses start and stop accounting requests, received from PDSNs, to determine when to notify the serving SCM to terminate an IP communication.

21 Claims, 7 Drawing Sheets

METHOD AND APPARATUS FOR SESSION RELEASE IN A COMMUNICATION SYSTEM

FIELD

The present invention relates to communication systems generally and specifically, to methods and apparatus for notification of a lost link in an Internet Protocol (IP) communication system.

BACKGROUND

There is an increasing demand for multiple services provided in a common communication system. Often these systems include a wireless portion, wherein information is transmitted via an air interface, and a data infrastructure, such as a wireline system using an Internet Protocol, referred to as IP. There is a need to support voice and other low-latency communications in combination with data services. For example, Voice over IP (VoIP) services may be offered over a wireless communication system configured with an IP data transmission system. As traditional wireless communication systems are designed for voice communications, the extension to support IP services introduces many challenges. Wireless communication systems are generally designed to handle lost signals, such as the loss of a connection incurred during the movement of a wireless device. Traditionally, IP communication systems have not had these considerations. As the wireless and IP communication systems coordinate, each must adapt to the specific requirements and problems of the other. Specifically, there is a need for a method of interfacing the two systems, and notifying the IP portion on loss of a communication path, referred to as a bearer connection. There is further a need to provide an indication of a loss of bearer connection to other participant(s) to an IP type communication, in particular, to a VoIP call. Similarly, there is a need for an efficient and accurate method and apparatus for releasing an Internet Protocol (IP) communication session.

DETAILED DESCRIPTION

Figure 1:
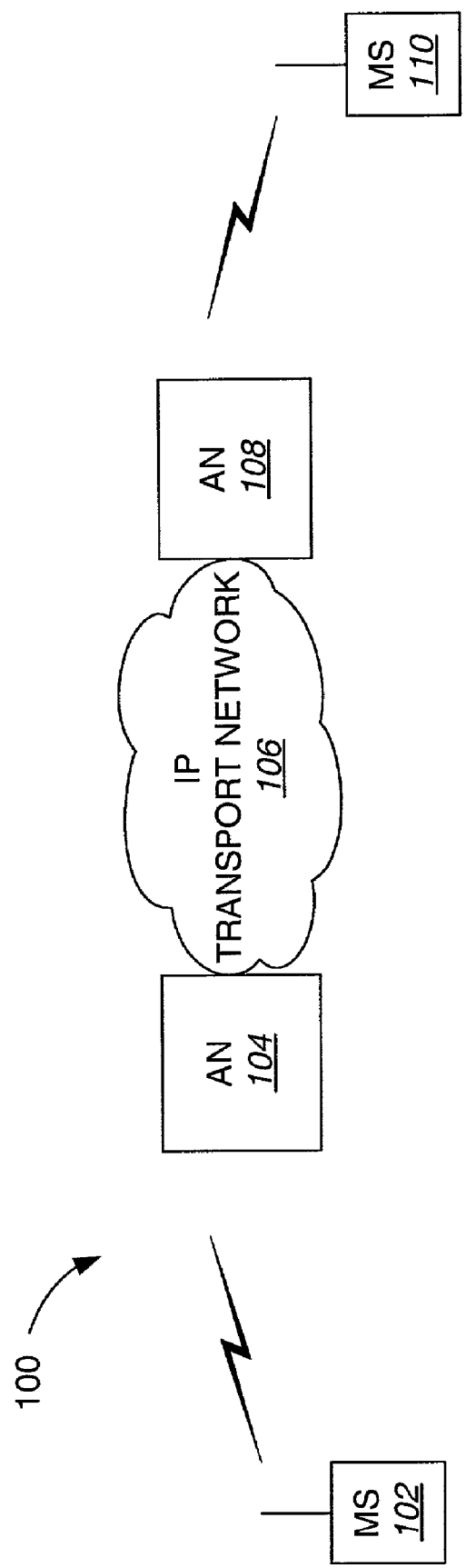
FIG. 1 is a diagram of a communication system supporting Internet Protocol (IP) communications.

The word "exemplar" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated. Specifically, note that while the present invention is described with respect to an exemplary embodiment related to Voice over IP (VoIP), alternate embodiments may implement other multi-format communications, such as low-latency communications with data communications, etc.

In a communication system having an interface with an Internet Protocol (IP) type network, specific signaling protocols are commonly used to address initiation, termination, and other issues involved in a communication. One such protocol is the Session Initiation Protocol or SIP. SIP is a signaling protocol used for Internet conferencing, telephony, presence, events notification and instant messaging, as well as many other Internet applications. SIP was developed within the IETF MMUSIC (Multiparty Multimedia Session Control) working group, with work proceeding since September 1999 in the IETF SIP working group; SIP is described in RFC 2543 entitled "SIP: Session Initiation Protocol," which is hereby expressly incorporated by reference.

Session Initiation Protocol (SIP)

The Session Initiation Protocol (SIP) is an application-layer control (signaling) protocol for creating, modifying and terminating sessions with one or more participants. These sessions may include, but are not limited to: Internet multimedia conferences, Internet telephone calls and multimedia distribution. Members in a session can communicate via multicast or via a mesh of unicast relations, or a combination thereof. The SIP specifies the signaling used to initiate, maintain and terminate a session, such as a Point-to-Point Protocol (PPP) session.

SIP may be used to establish, modify and terminate multimedia sessions or calls. Multimedia sessions may include multimedia conferences, distance learning, Internet telephony and similar applications. SIP may be used to invite both persons and devices, such as a media storage service, etc., to both unicast and multicast sessions, wherein the initiator may send invitations to a session to which it is not a part. SIP may be used to initiate sessions as well as invite members to sessions that have been advertised and established by other means. Sessions may be advertised using multicast protocols such as Session Announcement Protocol (SAP), electronic mail, news groups, web pages or directories, among others. The SIP transparently supports name mapping and redirection services, allowing the implementation of Integrated Services Digital Network (ISDN) and Intelligent Network telephony subscriber services. These facilities also enable personal mobility. In the parlance of telecommunications intelligent network services, personal mobility is the ability of end users to originate and receive calls and access subscribed telecommunication services on any terminal in any location, and the ability of the network to identify end users as they move. Personal mobility is based on the use of a unique personal identity (i.e., personal number).

Definitions

In the context of an IP communication using SIP, a call consists of all participants in a conference invited by a common source. An initiator is the calling party or caller; and is the party initiating a conference invitation. The invitee is the invited user, called party, or callee; and is the person or service that the calling party is trying to invite to a conference.

A SIP call is identified by a globally unique Call-Id. Thus, if a user is, for example, invited to the same multicast session by several people, each of these invitations will be a unique call. A point-to-point Internet telephony conversation maps into a single SIP call.

Requests sent from the caller to the callee (i.e., user agent client to user agent server) are referred to as downstream. Responses sent from the user agent server to the user agent client are referred to as upstream. Note that the calling party does not have to be the same as the one creating the call, session, or conference. An invitation is a request sent to a user (or service) requesting participation in a session. An SIP transaction occurs between a client and a server and includes the messages from the first request sent from the client to the server up to a final response sent from the server to the client. A successful SIP invitation consists of two transactions: an INVITE request followed by an ACK request. The ACK is identified with the corresponding INVITE request, but comprises an individual transaction. A final response terminates an SIP transaction.

A session is a set of senders and receivers and the data streams flowing from senders to receivers. A conference is an example of a session. A session as defined for Session Description Protocol (SDP) can comprise one or more Real-Time Protocol (RTP) sessions. As defined, a callee can be invited several times, by different calls, to the same session. If SDP is used, a session is defined by the concatenation of the user name, session id, network type, address type and address elements in the origin field.

A call leg or session is identified by the combination of Call-ID, caller or initiator and callee or invitee. A client is an application program that sends SIP requests. Clients may or may not interact directly with a human user. User agents and proxies contain clients (and servers). A conference may be a multimedia session, identified by a common session description. A conference may have zero or more members and may include, but is not limited to: a multicast conference, a full-mesh conference and a two-party "telephone call", as well as combinations of these. Any number of calls may be used to create a conference.

User Agent Client (UAC) is the calling user agent; a user agent client is a client application that initiates the SIP request. User Agent Server (UAS) is a server application that contacts the user when a SIP request is received and that returns a response on behalf of the user. The response accepts, rejects or redirects the request. The User Agent (UA) is an application which contains both a user agent client and user agent server.

Communication Using SIP

SIP invitations are used to create sessions, wherein the invitation carries session description(s) which allow participants to agree on a set of compatible media types. SIP supports user mobility by proxying and redirecting requests to the user's current location. Users may register their current location. SIP is not tied to any particular conference control protocol. SIP is designed to be independent of any lower-layer transport protocol(s) and may be extended with additional capabilities.

A successful SIP invitation consists of two requests: an INVITE followed by an ACK. The INVITE request asks the callee to join a particular conference or establish a two-party conversation. After the callee has agreed to participate in the call, the caller confirms receipt of the response by sending an ACK request. If the caller no longer wants to participate in the call, the caller sends a BYE request instead of an ACK. The INVITE request typically contains a session description that provides the called party with enough information to join the session. For multicast sessions, the session description enumerates the media types and formats that are allowed to be distributed to that session. For a unicast session, the session description enumerates the media types and formats that the caller is willing to use and where the media data is to be sent. In either case, if the callee wishes to accept the call, the callee responds to the invitation by returning a similar description listing the media to use. For a multicast session, the callee should only return a session description if the callee is unable to receive the media indicated in the caller's description or wants to receive data via unicast.

The communication system using an SIP may be considered as having two portions: a service portion and a network portion. The service portion overlays the network portion. The service portion is a logical grouping of elements that offers applications and content to subscribers of their services, such as session management. In the exemplary embodiment, session management is performed by a Session Control Manager (SCM). The network portion may be referred to as the "bearer" and is a logical grouping of elements that provide connectivity along the packet forwarding paths between initiator and invitee. The network contains various entities having responsibilities that include management of resources along the packet forwarding paths. The bearer is defined by the various communication links used for establishment and maintenance of the communication.

Incorporation of an IP session with wireless communication(s) presents various challenges in interfacing the two types of communications. Specifically, there is a need to resolve SIP sessions when bearer connections are lost. In other words, when a call is lost in the wireless portion of a system, i.e., bearer connection is lost, and an SIP session is active, there is a need for the wireless portion of the system to indicate the lost connection to the IP portion of the system. In a VoIP communication, in particular, it is desirable for the corresponding SCM to send a BYE message to terminate the SIP session. The SCM is not typically a part of the bearer path, and therefore a method is needed to notify the appropriate SCM(s) on loss of the bearer connection. Note that a voice communication, or other low-latency communication, may be considered a real-time communication, and therefore, loss of the bearer connection interrupts the call.

Typically, a "loss of bearer connection" occurs when the Packet Data Service Node (PDSN) removes the Point-to-Point Protocol (PPP) session of an MS. The exemplary embodiment, (as well as the following discussion), assumes the PDSN is the Access Gateway (AGW) for a cdma2000 type Access Network (AN), wherein PPP is the data-link layer protocol used between the MS and AGW. Alternate embodiments may implement alternate configurations and/or protocols for establishing and maintaining the communication. The loss of bearer connection may occur, but is not limited to, the following events:

1) expiration of a PPP inactivity timer;
2) expiration of Mobile IP registration lifetime;
3) MS sends LCP-Terminate to terminate the PPP session; and/or
4) A 10 session, which is the connection between a PCF and PDSN, is terminated "abnormally", (such as PCF malfunction), thus causing the corresponding PPP session to be removed in the PDSN.

Note that the exemplary embodiment supports dormant handoff, wherein an initial PPP session is established but no data is currently communicated and the MS establishes a second PPP session. During PDSN handoff when the MS is dormant, the MS establishes a new PPP session with the target PDSN, while the old PPP session in the serving PDSN is not removed. This sequence is referred to as dormant handoff. In this case, the expiration of the PPP timer and/or expiration of the Mobile IP registration lifetime are not necessarily indications of a loss of bearer connection. If the later established PPP session remains active, expiration of timers associated with the initial PPP session should not disrupt the communication. The Mobile IP registration lifetime and PPP session in the serving PDSN eventually will expire and be removed.

When this happens, the MS continues to have a bearer connection via the target PDSN. Therefore, there is no loss of bearer connection for the MS.

Similarly, during PDSN handoff when the MS is active (i.e., currently communicating via the bearer connection), the MS establishes a new PPP session with the target PDSN, while the old PPP session in the serving PDSN is removed, triggered by the termination of the R-P session between the serving PCF and serving PDSN. Although the PPP session is removed in the serving PDSN, the MS continues to have a bearer connection via the target PDSN. Therefore, there is no loss of bearer connection for the MS, and no triggering event for a loss of bearer connection. In other words, absence of traffic channels in dormancy and loss of traffic channels due to radio conditions should not be considered as the loss of bearer connection as long as a PPP session is maintained in the PDSN.

Note that the exemplary embodiment is provided as an exemplar throughout this discussion; however, alternate embodiments may incorporate various aspects without departing from the scope of the present invention. Specifically, the present invention is applicable to a data processing system, a wireless communication system, a unidirectional broadcast system, and any other system desiring efficient transmission of information.

Exemplary Communication System

The exemplary embodiment employs a spread-spectrum wireless communication system. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA200 standard of protocols. Alternate embodiments may incorporate another standard. Still other embodiments may apply the methods disclosed herein to other types of data processing systems.

FIG. 1 illustrates a communication system 100 supporting IP communications, and SIP communications specifically. The system 100 includes an IP transport network 106 serving as an IP interface between Access Network (AN) 104 and AN 108. AN 104 is the interface for MS 102, whereas AN 108 is the interface for MS 110. MS 102 communicates with AN 104 via radio communications over an air link. MS 110 communicates with AN 108 via radio communications over an air link. While system 100 is illustrated with MS 102 and MS 110, system 100 may support any number of end users. Similarly, the configuration illustrated is provided as an exemplar and alternate embodiments may implement alternate configurations including multiple access networks, IP interfaces, etc.

Continuing with FIG. 1, the AN 104, as well as the AN 108, includes the session control portion, as described hereinabove. For a call between MS 102 and MS 110, the network portion includes the AN 104, IP transport network 106, and AN 108. In other words, the bearer network or bearer connection for a call placed from MS 102 to MS 110 includes links from AN 104 to IP transport network 106. The bearer network may further be defined to include links from IP transport network 106 to AN 108. These links include the various interfaces for establishment and maintenance of a communication, such as a PPP communication as described hereinabove. The combination of the AN 104, the IP transport network 106 and the AN 108 also form a communication network, which in the exemplary embodiment is a wireline network.

The system 100 of FIG. 1 may be used to communicate Voice over IP (VoIP), which are voice messages that traverse an IP network. The VoIP transmissions or communications are effectively real-time communications; and therefore, any loss of information is considered critical. When any of the IP network connections or links, such as a link in a PPP session, is lost, the communication is interrupted. Note that this does not consider the case of handoff, but assumes only a single PPP session. Unlike a data transmission, wherein errors may result in retransmission of the lost data, a voice call is not stored, but is processed real-time. The loss of a PPP session or other IP link results in interruption of the voice message transmitted thereby. This presents a challenge in VoIP communications.

Figure 2:
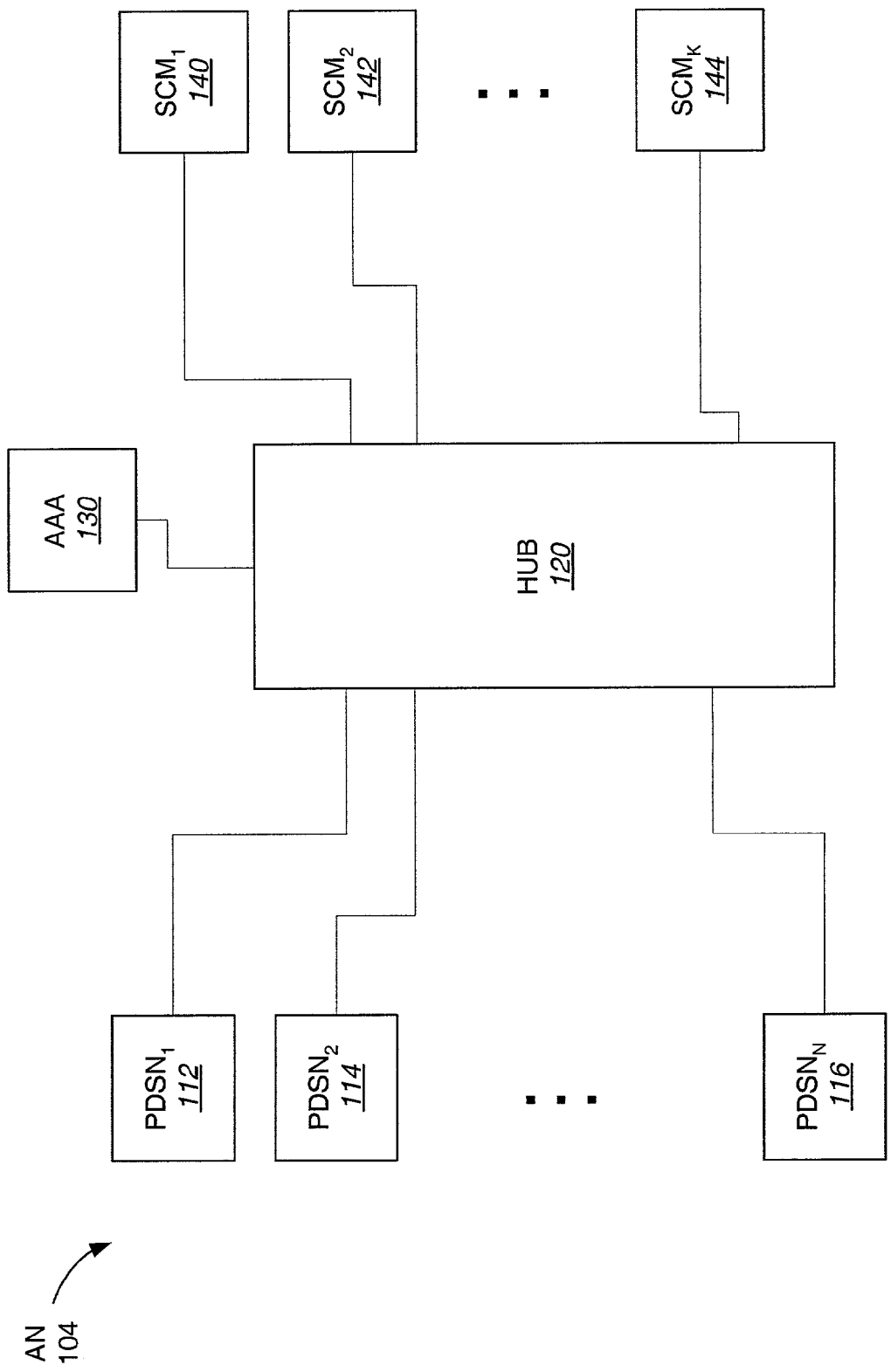
FIG. 2 is a block diagram of an Access Network (AN).

The AN 104 is further detailed in FIG. 2, wherein a HUB 120 is responsible for interfacing the various components or elements of the AN 104. The HUB 120 may be a local area network entity, such as an Ethernet type connector, or a wide area network entity, such as IP router, or a cloud of networking entities. In the exemplary embodiment, HUB 120 is a multicast router or a network of multicast routers. The AN 102 includes multiple PDSNs, labeled 1 through N. The various PDSN are illustrated as $PDSN_1$ 112, $PDSN_2$ 114, through $PDSN_N$ 116, each coupled to the HUB 120. AN 104 also includes multiple SCMs, labeled 1 through K. The various SCM are illustrated as SCM, 140, $SCM_2$ 142, through $SCM_K$ 144, each coupled to the HUB 120. A given communication or session may be established using any one of the $PDSN_1$ 112, $PDSN_2$ 114, through $PDSN_N$ 116 in combination with any one of the $SCM_1$ 140, $SCM_2$ 142, through $SCM_K$ 144. In addition, there is an Authentication Authorization Accounting (AAA) unit 130 coupled to the HUB 120. The AAA 130 serves the functions described therein, including providing authorization and authentication for a given session, and tracking accounting of each session. The AAA 130 interacts with multiple PDSNs ($PDSN_1$ 112, $PDSN_2$ 114, through $PDSN_N$ 116) to collect accounting records (e.g. byte/packet counts, airtime usage, etc.) and interacts with multiple SCMs ($SCM_1$ 140, $SCM_2$ 142, through $SCM_K$ 144) to authenticate/authorize SIP signaling. Additionally, AAA 130 may collect SIP-related accounting records (e.g. length of a SIP call) from the SCMs SCMs ($SCM_1$ 140, $SCM_2$ 142, through $SCM_K$ 144). In the exemplary embodiment, Diameter Protocol (discussed hereinbelow) will be the protocol used by the PDSNs ($PDSN_1$ 112, $PDSN_2$ 114, through $PDSN_N$ 116) and SCMs SCMs ($SCM_1$ 140, $SCM_2$ 142, through $SCM_K$ 144) to communicate with the AAA 130. The terms Diameter, Diameter Protocol, and DP each refer to the Diameter Protocol.

With respect to operation of AAA 130, the following definitions are provided for clarity; however, a detailed discussion of AM operations are described in a memo presented to the AAA Working Group entitled "Authentication, Authorization and Accounting (AAA) Transport Profile," by Adoba et al., dated 21 November 2001,which is hereby expressly incorporated by reference. Authentication is the act of verifying a claimed identity, in the form of a pre-existing label from a mutually known name space, as the originator of a message (message authentication) or as the end-point of a channel (entity authentication). Authorization is the act of determining if a particular right, such as access to some resource, can be granted to the presenter of a particular credential. Accounting refers to the act of collecting information on resource usage for the purpose of trend analysis, auditing, billing, or cost allocation.

Diameter Protocol

The exemplary embodiment implements another protocol for establishing and maintaining communications, specifically the Diameter Protocol, referred to herein as "DP." The DP is specified in a memo to the AAA Working Group entitled "Diameter Base Protocol" by Calhoun et al., dated November 2001, which is hereby expressly incorporated by reference. The Diameter base protocol is intended to provide an AM framework for Mobile-IP, Network Access Servers Requirement (NASREQ) and Roaming Operators Working Group, referred to as "ROAMOPS." This draft specifies the message format, transport, error reporting, and security services to be used by DP extensions.

The DP allows peers to exchange a variety of messages over a PPP session. The DP protocol provides for resource negotiation, error notification, as well as addition of new commands and resources as desired. Data delivered using the DP is in the form of an Attribute Value Pair (AVP). The DP provides at least the minimum specified information for an AAA transport protocol. Using DP, any node may initiate a request. In that sense, DP defines a peer-to-peer protocol. In the exemplary embodiment, a DP client, such as SCM of FIG. 2, initiates a request to the AAA, which is a DP server, for authentication and/or authorization of a given user. In another exemplary embodiment, a DP agent, such as $PDSN_1$ 112 of FIG. 2, initiates a request to the AAA 130 for accounting of a given user. A DP agent does not authenticate and/or authorize messages locally, such as proxies and relay agents. A DP server performs authentication and/or authorization of the user based on a profile. A DP node may act as an agent for certain requests while act as a server for others. The DP also supports server-initiated messages to access devices, such as a request to abort service to a particular user. In the exemplary embodiment, a DP server, such as AAA 130 of FIG. 2, initiates a request to the corresponding SCM, such as $SCM_1$ 140. The request is a notification that the bearer connection is lost. The corresponding SCM is then a DP client.

The DP is concerned with capabilities negotiation, how messages are sent and how peers may eventually be abandoned. The DP also defines certain rules which apply to all exchanges of messages between DP nodes.

Communication between DP peers begins with one peer sending a message to another DP peer. The set of AVPs included in the message is determined by a particular DP application. One AVP that is included to reference a user's session is the Session-Id. The initial request for authentication and/or authorization of a user would include the Session-Id. The Session-Id is then used in all subsequent messages to identify the user's session. The communicating party may accept the request, or reject it by returning an answer message with Result-Code AVP set to indicate an error occurred. The specific behavior of the DP server or client receiving a request depends on the DP application employed, the Session state, which is associated with a Session-Id, the answer, and according to rules specified by a DP application.

Lost Bearer Connection

Basically, for a DP session, one party sends a request and the second party sends an answer. When a bearer connection, such as a PPP session, is lost, it is desirable for the network to be notified and to send an indication to the other party. Note that a loss of bearer connection may occur in AN 104 and/or AN 108. In the exemplary embodiment, the indication of a loss of bearer connection is referred to as a "notification."

Figure 3:
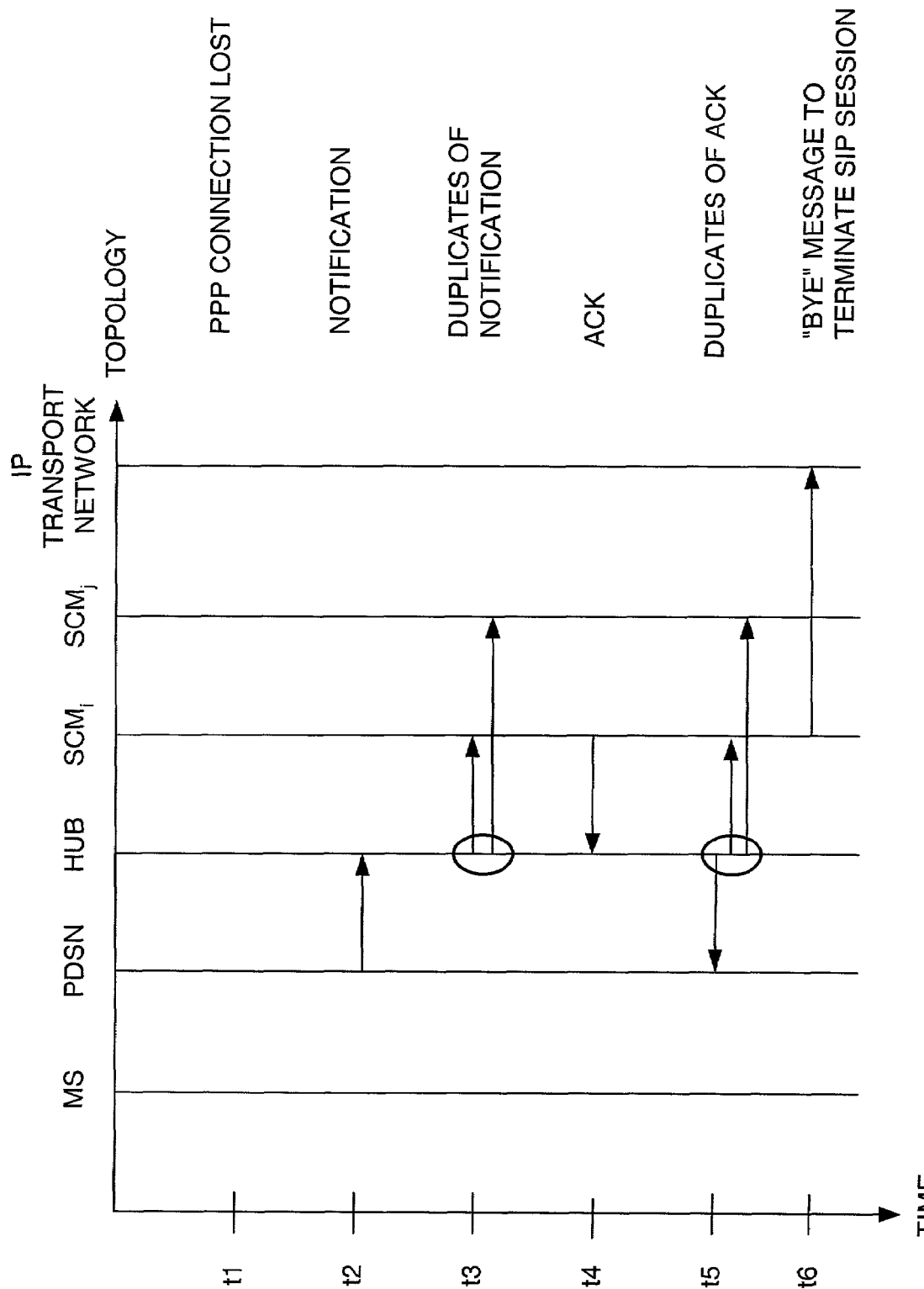
FIG. 3 is a timing diagram illustrating a method for notification of a lost Point-to-Point Protocol (PPP) connection.

A first type of notification is a direct communication from the PDSN to the associated SCM. Throughout the following discussion and examples, the bearer connection under consideration includes MS 102 and AN 104, and specifically, $PDSN_1$ 112 and $SCM_1$ 140. FIG. 3 illustrates a first embodiment of the direct communication type of notification. The method illustrated in FIG. 3 (and an extension thereof in FIG. 4) describes a protocol for session management. The timing diagram has a vertical time line with the various system components or topology specified on the horizontal axis. The method may be implemented in a system such as described in FIGS. 1 and 2. The method may involve MS 102, AN 104 or may involve MS 110, AN 108. The example illustrated in FIG. 3 does not include a dormant handoff, but rather represents the case of an active PPP session that is lost at time t1. At time t2, the corresponding $PDSN_1$ 112 sends a notification message to the HUB 120. The HUB 120 receives the notification message indicating that the specified PPP session is lost, and therefore the MS 102 may no longer receive the data and/or information provided. At time t3, the HUB 120 creates copies or duplicates of the notification message and provides these duplicates to each of the SCM in the system $SCM_i$ and $SCM_j$ are illustrated; however, the HUB 120 may send the duplicates to any number of components (including other PDSNs) in the AN. SCMi identifies the SCM serving MS 102 that has lost the PPP connection, which in this example is $SCM_1$ 140. SCMJ identifies any of the other SCMs not serving MS 102 for this session, i.e., not $SCM_1$ 140. At time t4, $SCM_j$ sends an ACKnowledge (ACK) message to the HUB 120. The HUB 120 then creates copies or duplicates of the ACK message, at time t5 and sends the duplicates to the $PDSN_1$ 112, as well as the SCMs. At time t6, in response to the ACK message, the SCMi sends a BYE message to the IP transport network addressed to the other party to the communication interrupted. The BYE message terminates the SIP session associated with the lost PPP session or bearer connection.

In the embodiment illustrated in FIG. 3, the notification method provides a message directly from the HUB 120 to the IP transport network 106, and defines an interface and protocol between the corresponding $PDSN_1$ 112 and $SCM_1$ 140. For illustrative purposes, assume the bearer connection under consideration is implemented via MS 102, AN 104, $PDSN_1$ 112, and $SCM_1$ 140. When a PPP session is removed in the serving PDSN, $PDSN_1$ 112, due to reasons other than a PDSN active handoff, the $PDSN_1$ 112 sends a notification message to all SCMs ($SCM_1$ 140, $SCM_2$ 142, through $SCM_K$ 144) in the AN 104 via an IP multicast. The use of IP multicast allows the $PDSN_1$ 112 (or any other PDSN that may implement the notification process) to process the notification without knowledge of the specific SCM supporting the lost session, i.e., the SCM that is part of the lost bearer connection. The notification message indicates the PDSN identity (e.g., by IP address), the MS identity (e.g., by Network Access Identifier (NAI), IP address, etc.), and the indication of loss of bearer connection. In the exemplary embodiment, the message is transported via User Datagram Protocol/IP (UDP/IP). A User Datagram Protocol (UDP) port number and an IP multicast address can be reserved for the protocol by the carrier. The reserved port number and address are inserted in the destination port and destination address fields of the UDP/IP packet, respectively. The reservation of a UDP port number and IP multicast address for the protocol may be implemented by a carrier as these values are for private use, and are only significant within the carrier's network. Alternate embodiments may use other protocols and/or applications for sending the notification message.

All SCMs as well as PDSNs in the carrier's network are provisioned to be the members of the reserved IP multicast group for bearer-loss notification. When a message is sent to this multicast group, all group members will receive the message. Upon receiving the notification message, only the SCM that currently serves the MS will respond with a reply message, and other uninterested recipients will discard the notification message silently. Note that alternate embodiments may define sets and/or subsets for a given session and/or service.

The reply message contains the SCM identity, the serving PDSN identity, and an acknowledgement (ACK or NACK). The reply message is sent in a UDP/IP packet to the same IP multicast group. Only the serving PDSN that sent the notification message will process the reply message, and other uninterested recipients will discard the reply message silently. If the serving PDSN did not receive a reply message within a specified amount of time, the PDSN may retransmit the notification message. Retransmissions may be specified up to a maximum number by the carrier.

The serving PDSN does not send a notification message if the PPP session is removed as part of the PDSN active handoff procedure. If the MS and target PDSN fail to establish a new PPP session during the PDSN active handoff, the target PDSN sends a notification message.

For PDSN dormant handoff, it is desirable to indicate to the serving PDSN that a dormant handoff has occurred. Thus, after the serving PDSN removes the expired PPP session, it sends a notification message according to the method described herein and with respect to FIGS. 3 and 4. As mentioned before, this should not be considered as a loss of bearer connection. In order to prevent the SCM from terminating the SIP session based on this false notification, the method illustrated in FIG. 4 may be implemented.

Figure 4:
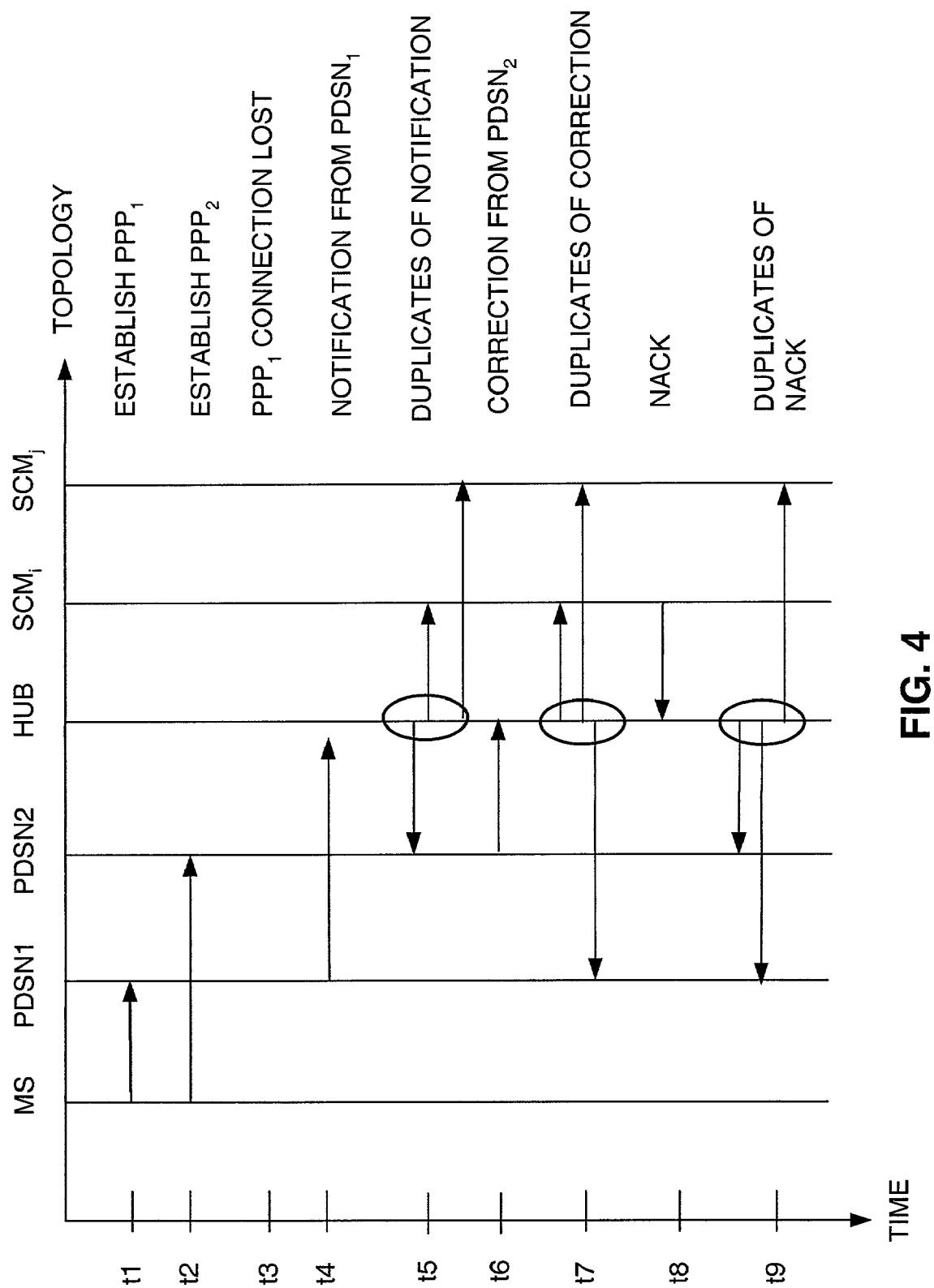
FIG. 4 is a timing diagram illustrating a method for notification of a lost PPP connection during a dormant handoff.

FIG. 4 illustrates "correction" of a false notification of a lost PPP connection during dormant handoff. The vertical axis is a time scale, and the horizontal axis represents the topology of the system. The method may be implemented in a system as described in FIGS. 1 and 2. The method and embodiment of FIG. 4 is complementary to the method and embodiment of FIG. 3, and, therefore, the methods and embodiments of FIGS. 3 and 4 may be provided in coordination within a given system. At time t1, a first PPP session is established, i.e., $PPP_1$ connection made. The MS 102 establishing the $PPP_1$ connection with $PDSN_1$ 112 is served by $SCM_j$ ($SCM_1$ 140) for SIP calls. At time t2, a second PPP session is established, i.e., $PPP_2$ connection made. The $PPP_2$ connection is established with $PDSN_2$ 114, and the MS 102 continues to be served by $SCM_j$ ($SCM_1$ 140). At time t3, the first PPP session is lost, i.e., $PPP_1$ connection is lost. In response to the loss of $PPP_1$, $PDSN_1$ 112 sends a notification of the lost PPP connection at time 4. The HUB 120 receives the notification from $PDSN_1$ 112 and in response duplicates the notification. The HUB 120 sends out the duplicates at time t5. The duplicates are sent to each of the SCM ($SCM_1$ 140, $SCM_2$ 142, through $SCM_K$ 144) as well as to each of the PDSN ($PDSN_2$ 114, through $PDSN_N$ 116). As illustrated, the duplicate of the notification is not sent to $PDSN_1$ 112, however, alternate embodiments may send to all of the PDSN and SCM units, or may send to a subset thereof specific to the application, session, service, and/or system.

Continuing with FIG. 4, upon receipt of the notification, $PDSN_2$ 114 recognizes the notification as a false notification. In other words, $PDSN_2$ 114 has an active PPP session and therefore there is no loss of bearer connection. $PDSN_2$ 114 therefore, sends an indication to the HUB 120 identifying the notification from $PDSN_1$ 112 as a false notification at time t6. The indication is referred to herein as a "correction." The HUB 120 receives the correction from $PDSN_2$ and in response duplicates the correction and sends the duplicates to the various SCM ($SCM_1$ 140, $SCM_2$ 142, through $SCM_K$ 144) and to $PDSN_1$ 112 at time t7. At time t8, the $SCM_i$ that serves the MS 102 sends a NACK to the HUB 120. The NACK effectively disarms the impact of the false notification. The HUB 120 then duplicates the NACK and sends the duplicates to the various PDSN ($PDSN_1$ 112, $PDSN_2$ 114, through $PDSN_N$ 116) and to the SCM not supporting the lost bearer connection ($SCM_2$ 142, through $SCM_K$ 144). Note as stated hereinabove, the notifications, corrections, acknowledgements, negative acknowledgements, as well as the duplicates thereof may be sent to all of the elements within the system, or may be sent to a specific group, set, subset, or predetermined ones of the elements of the system.

In the embodiment illustrated in FIG. 4, the $PDSN_2$ 114 receives the notification message sent by the serving PDSN, $PDSN_1$ 112. From the notification message, the $PDSN_2$ 114 recognizes the MS 102 identity contained within the message. Because the $PDSN_2$ 114 is currently providing a bearer connection (i.e., $PPP_2$) for the identified MS 102, the $PDSN_2$ 114 sends a correction message to indicate that the notification sent by the $PDSN_1$ 112 is invalid.

The $SCM_i$ ($SCM_2$ 142) currently serving the MS 102 receives both the notification message and the correction message. In response to the $PDSN_1$ 112 notification message, the $SCM_i$ ($SCM_2$ 142) sends a reply message containing the NACK (Negative ACKnowledge). In response to the $PDSN_2$ 114 correction message (invalidating the $PDSN_1$ 112 notification message) the $SCM_i$ ($SCM_2$ 142) sends a reply message containing ACK (not shown). The ACK is an acknowledge message and serves as a confirmation.

While the transmission of messages is provided in a given sequence illustrated in FIGS. 3 and 4, the reply and/or answer messages, such as ACK and/or NACK, may occur at any time after the request and/or notification and/or correction messages. The sequence may be specified by the carrier, and/or to meet other system criteria.

The IP multicast transport for the protocol(s) described in the embodiments of FIGS. 3 and 4 are within a carrier's network, and are, therefore, used in a private network. Thus, the IP multicast packets will not travel outside the carrier network. Similarly, entities outside the carrier network will not be able to send packets to a reserved IP multicast group. Moreover, the carrier may provision multicast keys to protect messages exchanged on the PDSN-SCM interface, in order to prevent internal security attack (e.g., attack by disgruntled employees, or competitors, etc.).

Note that the $PDSN_1$ 112 could send notification and correction messages unnecessarily. A PDSN generally is not aware of the status of a bearer connection, i.e., use for transporting contents for a SIP session. Thus, the $PDSN_1$ 112 sends the notification message to indicate the loss of a bearer connection, even when the MS 102 may not be involved in an SIP session or communication. In this case, there will be no response from any SCM, as there is no active SIP session. The $PDSN_1$ 112 may retry a predetermined number of times before it gives up. In one embodiment, the maximum number of retransmission is set to a small value (e.g., 3) to minimize unwanted notification traffic.

Figure 5:
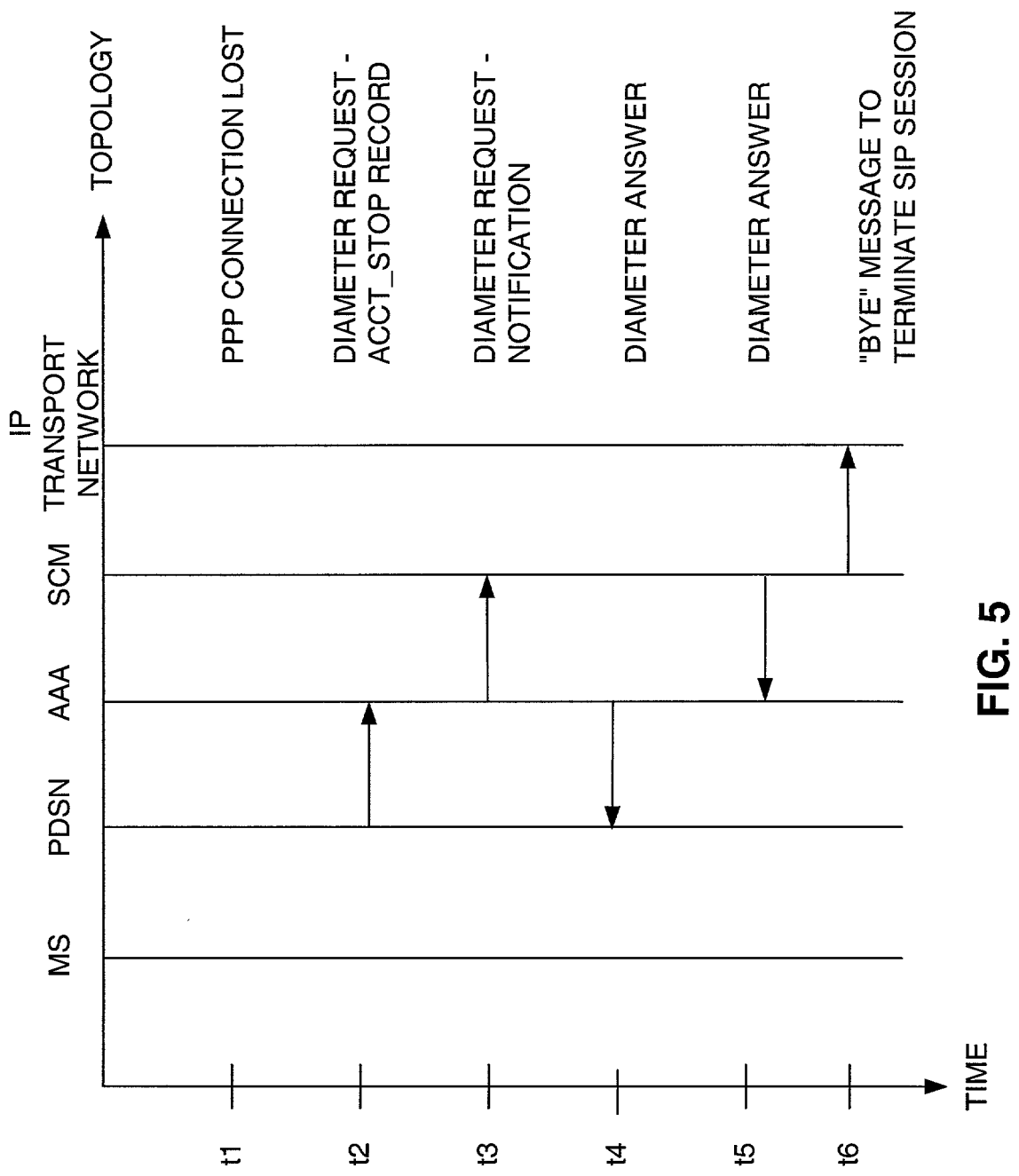
FIG. 5 is a timing diagram illustrating a method for notification of a lost Point-to-Point Protocol (PPP) connection.

FIG. 5 illustrates an embodiment for notification of a lost bearer connection wherein the AAA 130, as illustrated in FIG. 2, sends the notification to a supporting SCM. As illustrated, the vertical axis represents time, and the horizontal axis represents the various components of the system. In this case, the components include MS 102, $PDSN_1$ 112, AAA 130, $SCM_1$ 140, and IP transport network 106, as illustrated in FIGS. 1 and 2. At time t1 the PPP connection between $PDSN_1$ 112 and $SCM_1$ 140 is lost. At time t2, the $PDSN_1$ 112 sends a DP request to the AAA 130 to stop accounting. The request is identified as ACCT_STOP RECORD. At time t3, the AAA 130 sends a DP request notification to the $SCM_1$ 140 supporting the PPP connection that was lost. At time t4, the AAA 130 sends a DP answer to the $PDSN_1$ 112. The answer is in response to the DP request from $PDSN_1$ 112 to stop accounting. At time t5, the $SCM_1$ 140 sends a DP answer to the AAA 130 in response to the DP request received from the AAA 130. At time t6, the $SCM_1$ 112 sends a BYE message to the IP transport network 106. The BYE message terminates the SIP session.

Figure 6:
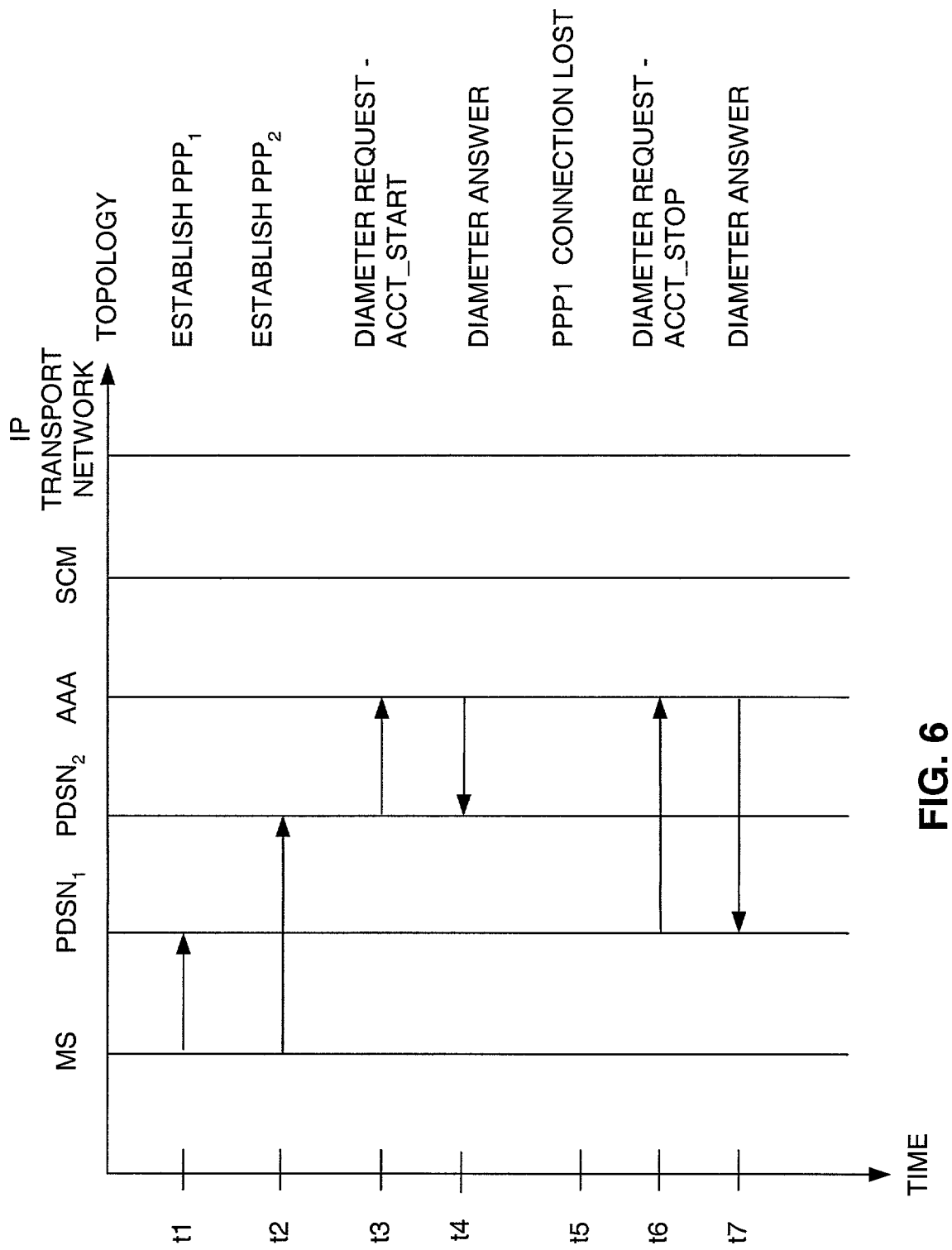
FIG. 6 is a timing diagram illustrating a method for notification of a lost PPP connection during a dormant handoff.

The embodiments illustrated in FIGS. 5 and 6 use standard protocols and currently defined interfaces. Specifically, the exemplary embodiments use DP and PDSN-AAA and AAA-SCM type protocols, but may be implemented using a variety of protocols, interfaces, applications, etc., as well as combinations thereof.

When the PPP session is removed, the serving PDSN sends to the AAA a DP request containing the accounting-stop record. The accounting record includes a set of application-specific DP AVPs that are to be defined. The application-specific operation may be 3GPP2-specific, for example, wherein the AVPs are based on the 3GPP2-specific RADIUS attributes defined in P.S0001-A "Wireless IP Network Standard".

In addition to the accounting information (e.g.: byte/packet counts, airtime usage, etc.), the record also has the release indicator that explains the reasons for sending the accounting-stop record. The possible reasons include, but are not limited to, PPP session expiration, Mobile IP registration lifetime expiration, PPP termination initiated by the MS or PDSN, and PDSN active handoff. The method is analogous to the RADIUS accounting-stop record used in P.S0001-A. Upon receiving the DP request, the AAA replies with the DP answer to acknowledge the serving PDSN. Based on the release indicator, the AAA server decides if an appropriate SCM should be notified about the loss of a bearer connection for an MS. If the release indicator indicates PDSN active handoff, the AAA will not notify the SCM. If the release indicator indicates the expiry of a PPP session or Mobile IP registration for an MS. If the AAA server has already received from the target PDSN the accounting-start record for the same MS, indicating that the MS has an established a new bearer connection (i.e. PPP session) with the target PDSN. The establishment of a new session while another session is active is accomplished via the PDSN dormant handoff procedure. Therefore, the AAA server will not notify the SCM. If the AAA does not have any accounting-start records for the same MS, indicating that the MS has no other bearer connections. Therefore, the AAA will notify the SCM that the MS has lost its bearer connection. If the release indicator indicates PPP termination initiated by the MS or PDSN, the AAA server will notify the SCM that the MS has lost its bearer connection. If the AAA server determines that the MS has lost its bearer connection, the AAA server will send a DP request to notify[1] the appropriate SCM. The AAA server knows which SCM to notify, since previously that SCM interacted with the AAA server to authenticate and authorize the MS for SIP signaling. Upon receiving the DP request, the SCM replies with the DP answer to acknowledge the AAA server. The PDSN-AAA and AAA-SCM interfaces can be secured via IPSec to prevent internal security attack.

FIG. 6 illustrates application of one embodiment (similar to the embodiment illustrated in FIG. 5) used in a dormant handoff situation. In this case a first PPP connection, $PPP_1$, is established at time t1 between the MS 102 and $PDSN_1$ 112. The accounting information associated with $PPP_1$ session is sent to AAA 130 via a DP request to start accounting (ACCT_START) and then AAA 130 responding with a DP answer confirming the accounting, etc. (steps not shown). A second PPP connection, $PPP_2$, is established at time t2 between the same MS 102 and $PDSN_2$ 114. The $PDSN_2$ 114 sends a DP request (ACCT_START) to the AAA 130 at time t3. The AAA 130 sends a DP answer to $PDSN_2$ 114 at time t4. Some time later, at time t5, the $PPP_1$ connection is lost because the resource timer for the $PPP_1$ connection has expired. The $PDSN_1$ 112 sends a DP request to stop accounting (ACCT_STOP) at time t6. The AAA 130 confirms with a DP answer at time t7. As the AAA 130 has received the DP request from $PDSN_2$ 114 indicating establishment of session $PPP_2$, the AAA 130 is aware of the continued bearer connection, and therefore does not send a notification to $SCM_1$ 140. The MS communication continues using $PDSN_2$ 114 and the $PPP_2$ session.

Figure 7:
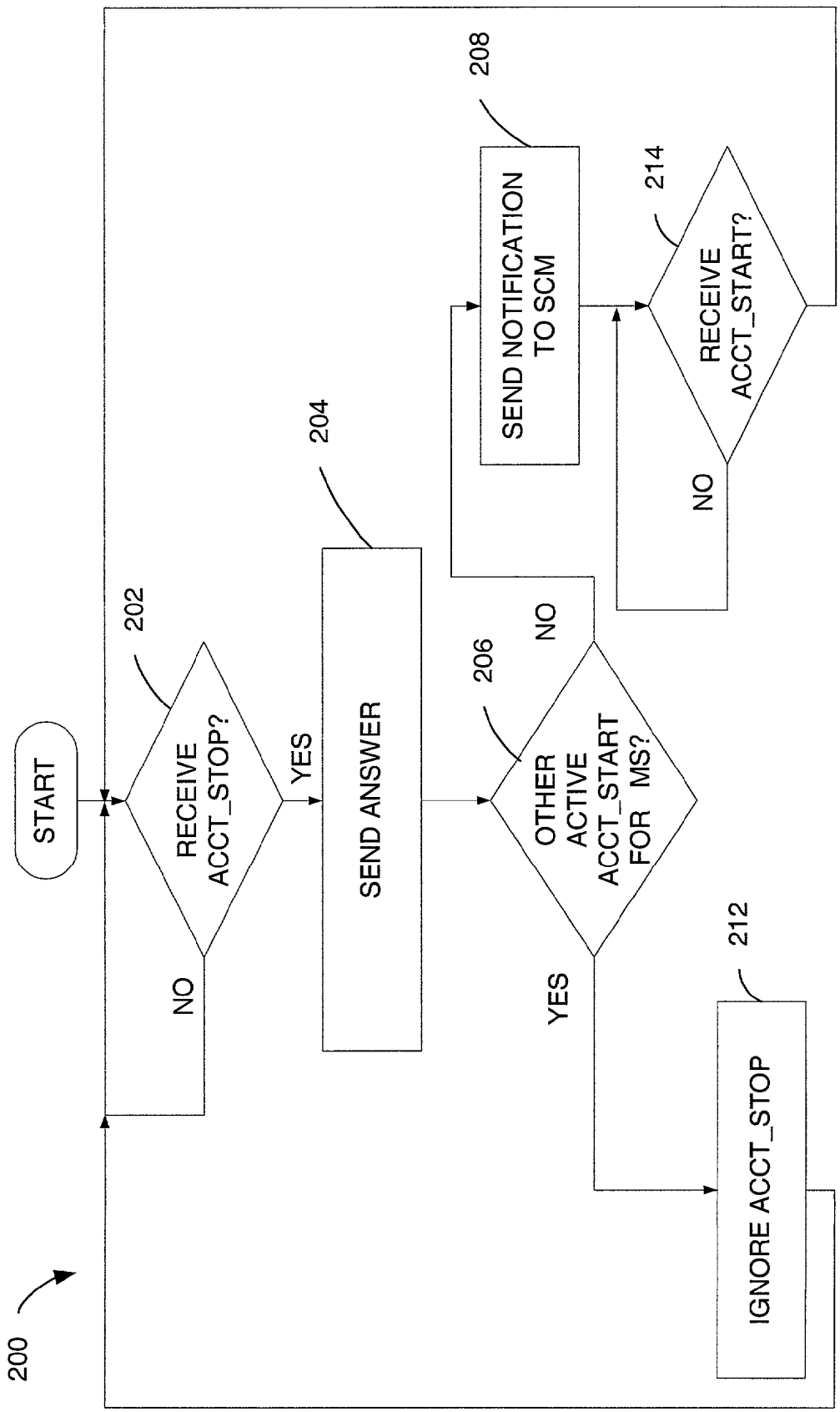
FIG. 7 is a flow diagram of a portion of a method for notification of a lost PPP connection during a dormant handoff.

FIG. 7 illustrates the processing flow at the AAA 130 in a scenario as illustrated in FIG. 6. The process 200 starts on receipt of a DP request for an ACCT_STOP, i.e., request to stop accounting for a specified SIP session, at decision diamond 202. On occurrence of an ACCT_STOP request, the process sends an answer at step 204. Note that this may occur later in the process, and is included at this point simply according to one embodiment. At decision diamond 206, the process 200 determines if the AM has received any other ACCT_START requests for the specified MS (other than from the ACCT_STOP requestor). If no other ACCT_START requests are active, the AAA sends a notification to the associated SCM at step 208, wherein the notification indicates a loss of bearer connection. From step 208, the AAA waits to receive an ACCT_START request. Upon receipt of an ACCT_START request, processing returns to decision diamond 202 to wait for an ACCT_STOP request. Returning to decision diamond 206, if any other ACCT_START request is active for the specified MS (i.e., the MS identified in the ACCT_STOP request received at decision diamond 202), processing continues to step 212 to ignore the ACCT_STOP request. Processing again returns to decision diamond 202 to await an ACCT_STOP request.

The embodiments provided hereinabove provide both direct communication from the HUB 120 and also from an accounting element with the AN 104, the AAA 130. The use of the AAA allows implementation of the process without changing existing standards and protocols. Further, the use of the AAA provides efficiency by avoiding the sending of notifications of bearer communication loss to the SCM unnecessarily, as when the MS is not using SIP. Further, the AAA server knows whether or not the MS is using SIP, as the AAA provides SIP authentication and authorization of the MS and SCM.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a communication system supporting Internet Protocol (IP) communications, a method comprising:
    identifying a loss of a bearer connection for an IP communication which is a voice communication, wherein the loss of the bearer connection comprises removal of a Point-to-Point Protocol (PPP) session by a packet data service node;
    providing a notification of the loss of bearer connection, comprising: receiving a notification from a packet data service node within the communication system, duplicating the notification to form at least one notification duplicate, and sending one of the at least one notification duplicates to a session control manager within the communication system; and
    terminating the IP communication.

2. The method as in claim 1, further comprising:
    receiving an acknowledge message from the session control manager;
    duplicating the acknowledge message to form at least one acknowledge duplicate; and
    sending one of the at least one acknowledge duplicates to the packet data service node.

3. The method as in claim 2, further comprising:
    sending another one of the at least one notification duplicates to a second session control manager; and
    sending another one of the at least one acknowledge duplicates to the second session control manager.

4. The method as in claim 3, wherein the session control manager supports the PPP session.

5. The method as in claim 4, wherein the second session control manager is inactive with respect to the PPP session.

6. In a communication system supporting Internet Protocol (IP) communications, a method comprising:
    initiating a first Point-to-Point Protocol (PPP) session for an IP communication;
    initiating a second PPP session for the IP communication;
    receiving a notification of the loss of the first PPP session;
    receiving a correction to ignore the notification; and
    ignoring the notification.

7. The method as in claim 6, wherein providing a notification of the loss of first PPP connection further comprises:
    receiving a notification from a first packet data service node within the communication system;
    duplicating the notification to form at least one notification duplicate; and
    sending one of the at least one notification duplicates to a session control manager within the communication system.

8. The method as in claim 7, further comprising:
    receiving a correction message from a second packet data service node;
    duplicating the correction message to form at least one correction duplicate; and
    sending one of the at least one correction duplicates to the packet data service node.

9. The method as in claim 8, further comprising: sending another one of the at least one correction duplicates to a second session control manager.

10. The method as in claim 9, wherein the session control manager supports the PPP session.

11. The method as in claim 10, wherein the second session control manager is inactive with respect to the PPP session.

12. The method as in claim 11, further comprising:
    receiving a negative acknowledge from the session control manager;

duplicating the negative acknowledge to form at least one negative acknowledge duplicate; and sending one of the at least one negative acknowledge duplicates to the second session control manager.

13. In a communication system supporting Internet Protocol (IP) communications, a method comprising:

initiating a first Point-to-Point Protocol (PPP) session for an IP communication;

initiating a second PPP session for the IP communication;

receiving a notification of the loss of the first PPP session;

receiving a correction to ignore the notification; and ignoring the notification.

14. In a communication system supporting Internet Protocol (IP) communications, the communication system employing an accounting unit, a method comprising:

receiving a request to stop accounting for a first IP communication, the request to stop accounting corresponding to loss of a bearer connection of a first Point-to-Point Protocol (PPP) session;

if a second PPP session is active for the IP communication, ignoring the request to stop accounting; and if the first PPP session is the only active PPP session for the first IP communication, terminating the IP communication.

15. The method as in claim 14, wherein a request to start accounting initiates an active PPP session.

16. The method as in claim 15, wherein the system supports Diameter Protocol communications.

17. In a communication system supporting Internet Protocol (IP) communications, an apparatus comprising:

means for receiving a request to stop accounting for a first IP communication, the request to stop accounting corresponding to loss of a bearer connection of a first Point-to-Point Protocol (PPP) session;

means for ignoring the request to stop accounting if a second PPP session is active for the IP communication; and means for terminating the IP communication if the first PPP session is the only active PPP session for the first IP communication.

18. The apparatus as in claim 17, wherein the apparatus is an Authentication Authorization Accounting (AAA) server.

19. The apparatus as in claim 17, further comprising:

means for generating Diameter Protocol requests, wherein the Diameter Protocol requests include a notification of loss of the first PPP session; and means for receiving Diameter Protocol answers.

20. A data processing apparatus, comprising:

memory storage element; and a processor configured to: receive a request to stop accounting for a first IP communication, the request to stop accounting corresponding to loss of a bearer connection of a first Point-to-Point Protocol (PPP) session;

ignore the request to stop accounting if a second PPP session is active for the IP communication; and terminate the IP communication if the first PPP session is the only active PPP session for the first IP communication.

21. A computer product having a computer-readable medium physically embodied with computer-readable instructions, when executed by a computer causes the computer to:

receiving a request to stop accounting for a first IP communication, the request to stop accounting corresponding to loss of a bearer connection of a first Point-to-Point Protocol (PPP) session;

ignoring the request to stop accounting if a second PPP session is active for the IP communication; and terminating the IP communication if the first PPP session is the only active PPP session for the first IP communication.

* * * * *